UNITED STATES PATENT OFFICE.

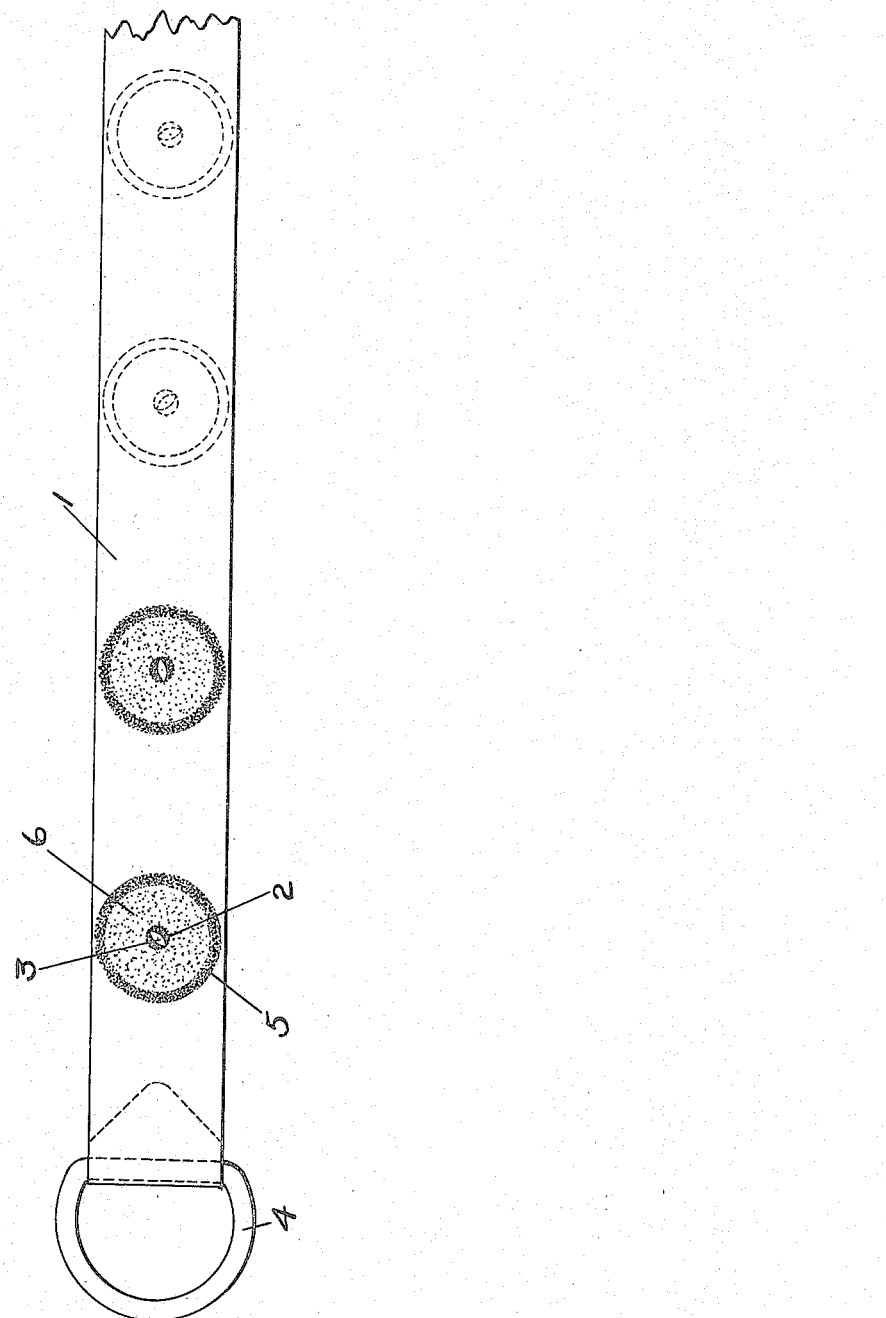

WILLIAM NELSON McCOMB, OF NEW YORK, N. Y.

SEED-TAPE.

1,143,980.  Specification of Letters Patent.  Patented June 22, 1915.

Application filed August 20, 1913. Serial No. 785,634.

*To all whom it may concern:*

Be it known that I, WILLIAM NELSON MC-COMB, a citizen of the United States, and a resident of the borough of Manhattan, in the county of New York, city and State of New York, have invented certain new and useful Improvements in Seed-Tape, of which the following is a specification.

The present invention relates to planting and sowing of seed of vegetables, flowers, etc., in a manner that insures absolute accuracy in the alinement and spacing of seed and that will prevent the enormous waste of seed which is the result when sown by hand or by the so-called mechanical seeders.

Since the seeds of any variety of vegetation vary in size, it is impossible to devise a machine that will accommodate the larger seed and at the same time drop the small seed singly or uniformly. Mechanical seeders frequently become choked and at such times fail to distribute seed in the drill. And at other times they discharge large quantities of seed in piles, resulting in great waste and crowding of plants, none of which can develop properly. The cut-off of the mechanical seeder must act rapidly where fairly close spacing is desired, and, owing to the construction of the cut-off, many seed are crushed or sheared and ruined during the operation of the machine.

Almost invariably when seed are sown by hand or by the usual sowing machine they are too thick to allow the young plants sufficient room to grow without crowding. This necessitates the thinning out of the young plants, the roots of which are intermingled and tangled, with the result that the plants which are allowed to remain have their roots more or less disturbed and in consequence the growth of the plant is checked or dwarfed and sometimes killed.

Briefly the invention consists in a roll of strip or a tape-like material having seeds secured thereto in a particular manner and having its outer end provided with a suitable eyelet for fastening one end of the tape when the same is being stretched upon the ground. This roll of material is to be of such substance as will disintegrate in the ground. This roll of material is to be unrolled and buried in the ground with the result that the seed will germinate and grow to produce plants or vegetables in proper spaced relation. The carrying strip may be provided with a fertilizer and with an insecticide or poison bait.

In the accompanying drawing, which is a plan view of a portion of a carrying strip or tape embodying my invention, the numeral 1 denotes the carrying strip proper which is to be wound into a roll. The material of this strip may be of paper, porous cloth, gelatin or other suitable material, and may be treated with a fertilizer in solution by a spray or by immersion, or the fertilizer may be applied in granular or powdered form. Small drops or spots of mucilage, glue or other innocuous adhesive substance, readily soluble in water, are applied in predetermined spaces, as shown at 2. The seed 3 is then applied to the glue in any convenient manner, as by sifting or otherwise, the tape or strip being thereafter agitated to dislodge all except the seed required. The tape is then stretched or laid flat, seed up, to dry and then wound into a roll or reel. The outer end of said roll of tape is provided with an eyelet 4 so that a small stake can be used for holding the tape in its proper position while it is being unrolled either by hand or by a simple machine designed for the purpose.

If desired, a poison bait which is innocuous to the plant but which acts as an insecticide can be applied to the tape. Such poison bait may consist of bran, sugar and arsenate of lead and will preferably be applied by means of an adhesive to form a ring, as at 5, around the seed.

Instead of impregnating the strip as a whole with fertilizer, this may be applied, as indicated by the dots 6, between the poison bait and the seed. Any suitable fertilizer may of course be used, such as bone meal.

In addition to the advantages already stated, it will be noted that the use of this strip also enables the seed to be planted at a uniform depth, which is of advantage.

What is claimed, is:

As a new article of manufacture, a roll of flat flexible disintegrable tape, seeds secured substantially along the longitudinal center in spaced relation to each other and upon one face of the tape, fertilizing and insecticide material applied to the tape only around each seed, and means secured to the outer end of the tape adapted to engage a suitable fastening means in the ground while the tape is being stretched thereupon.

Signed at New York city, in the county of New York and State of New York this 11th day of August A. D. 1913.

WILLIAM NELSON McCOMB.

Witnesses:
LENA STRASS,
E. J. CLEARY.